United States Patent [19]
Yoneda et al.

[11] Patent Number: 4,694,233
[45] Date of Patent: Sep. 15, 1987

[54] NUMERICAL CONTROL APPARATUS FOR MACHINE

[75] Inventors: Takao Yoneda, Nagoya; Hiroshi Nakano, Toyoda, both of Japan

[73] Assignee: Toyoda Koki Kabushiki Kaisha, Kariya, Japan

[21] Appl. No.: 902,659

[22] Filed: Sep. 2, 1986

[30] Foreign Application Priority Data

Aug. 31, 1985 [JP] Japan .................. 60-192991

[51] Int. Cl.$^4$ .......................... G05B 19/18
[52] U.S. Cl. .................... 318/569; 235/10; 318/590; 318/600
[58] Field of Search .............. 235/10, 11; 318/590, 318/600, 569

[56] References Cited

U.S. PATENT DOCUMENTS

| | | | |
|---|---|---|---|
| 3,319,054 | 5/1967 | Kelling | 235/310 |
| 3,539,788 | 11/1970 | McGee | 235/310 |
| 3,725,652 | 4/1973 | Konvalina | 318/600 X |
| 3,801,803 | 4/1974 | McDaniel | 235/10 |
| 3,818,303 | 6/1974 | Rossel | 318/603 |
| 4,051,356 | 9/1977 | Hakata | 235/310 |
| 4,228,516 | 10/1980 | Johnston, Sr. | 235/310 |

Primary Examiner—Benjamin Dobeck
Attorney, Agent, or Firm—Oblon, Fisher, Spivak, McClelland & Maier

[57] ABSTRACT

A numerical control apparatus for controlling a machine which includes a movable element and a servomotor for moving the element. The numerical control apparatus includes memory means for storing numerical data representing parameters such as amount and rate of movement of the element. The numerical data are expressed either or both in a first and second system of measurement. Codes are stored in the memory means for some of the numerical data which are expressed in the first system to define basic movements of the element. The numerical control apparatus is settable to be operable for data expressed in either the first or second system of measurement. The numerical data expressed in the second system of measurement are automatically converted into the first system when the numerical control apparatus is set to be operable for data expressed in the second system of measurement.

9 Claims, 7 Drawing Figures

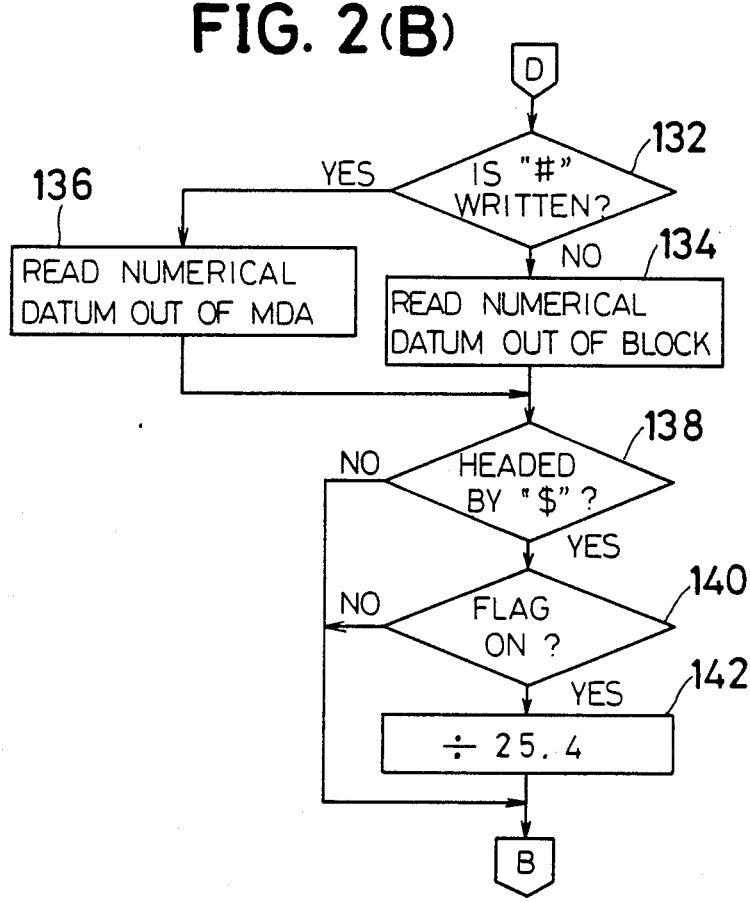

NUMERICAL CONTROL APPARATUS FOR MACHINE

BACKGROUND OF THE INVENTION

1. Field of the Invention

The present invention relates to a numerical control apparatus for a machine which is operable both in the metric system of measurement and in the English system of measurement.

2. Description of the Background Art

There are cases wherein a machine tool controlled by a numerical control apparatus is built in a country using the metric system and is sold in a country using the English system. It is desirable that the machine tool be operable in the metric system when workers of a manufacturer build, adjust and preliminarily operate it.

Moreover, as numerical data which represent parameters such as feed amount and feed rate of basic movements of machine elements are to be preliminarily set by the maker, such numerical data are more easily expressed in the metric system of measurement when input into a memory of the control apparatus. The workers can thus quickly build the machine tool in an easy and safe manner.

A user of the machine tool creates a numerical control program which may also include numerical data representing such parameters as feed amount and feed rate for performing specific machinery operations on a workpiece or which may rely on such data previously input by the manufacturer. In the country using the English system of measurement, the user creates such a numerical control program which expressing the numerical data in the English system.

Therefore, it is desirable that the numerical control apparatus be able to control the machine tool with the numerical data expressed in the metric system for the basic movements of the machine elements and with the numerical data expressed in the English system for specific machinery operations.

There is known a numerical control apparatus for controlling a machine tool which is switchable to operate either in the metric system or in the English system of measurement. However, if the conventional numerical control apparatus is set to operate in the English system, all numerical data must be expressed in the English system. Therefore, the numerical data expressed in the metric system representing parameteres such as feed amount and feed rate of the basic movements need to be converted into the English system. Such conversion is time and labor consuming, and could be a cause of errors in the numerical data.

SUMMARY OF THE INVENTION

It is therefore an object of the present invention to provide an improved numerical control apparatus which avoids the drawbacks of the known numerical control apparatus which is switchable to operate either entirely in a first system of measurement or entirely in a second system of measurement.

Another object of the present invention is to provide a numerical control apparatus which is able to control a machine with numerical data expressed in a first system of measurement as well as numerical data expressed in a second system of measurement, without any manual intervention.

A further object of the present invention is to provide a numerical control apparatus wherein it is not necessary to manually convert numerical data expressed in a first system of measurement into numerical data expressed in a second system of measurement.

Briefly, according to the present invention, these and other objects are achieved by providing a numerical control apparatus for controlling a machine which includes a movable element and a servomotor for moving the movable element. The numerical control apparatus includes memory means for storing numerical data representing parameters such as amount and rate of movement of the element. The numerical data are expressed either or both in a first system of measurement and in a second system of measurement. Codes are stored in the memory means for the numerical data expressed in the first system. The numerical control apparatus is settable to be operable for data expressed either in the first system or in the second system of measurement. The numerical data expressed in the second system of measurement are converted into numerical data expressed in the first system when the numerical control apparatus is operable for data expressed in the second system of measurement. More broadly, the data is consistently expressed in one or the other of the systems when operated upon by the control apparatus.

A servomotor for the movable element is excited in accordance with the numerical data stored in the memory means which is determined to be expressed in the first system of measurement by detection of the corresponding codes, and in accordance with the numerical data converted into the first system when the numerical control apparatus is operable for data expressed in the second system of measurement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2(A) and 2(B) are flow charts of a system program executed by a central processing unit shown in FIG. 1 in controlling movement of a movable element of a machine;

FIGS. 3(A) through 3(C) show examples of numerical control programs used in a numerical control apparatus according to the present invention, wherein FIG. 3(A) is a numerical control program having control data expressed in metric system for use in an English system country, FIG. 3(B) is a numerical control program having control data expressed in either English system for an English system country or metric system for a metric system country, and FIG. 3(C) is a numerical control program having addresses for stored metric system data in an English system country.

DETAILED DESCRIPTION OF THE PREFERRED EMBODIMENTS

Figure 1:
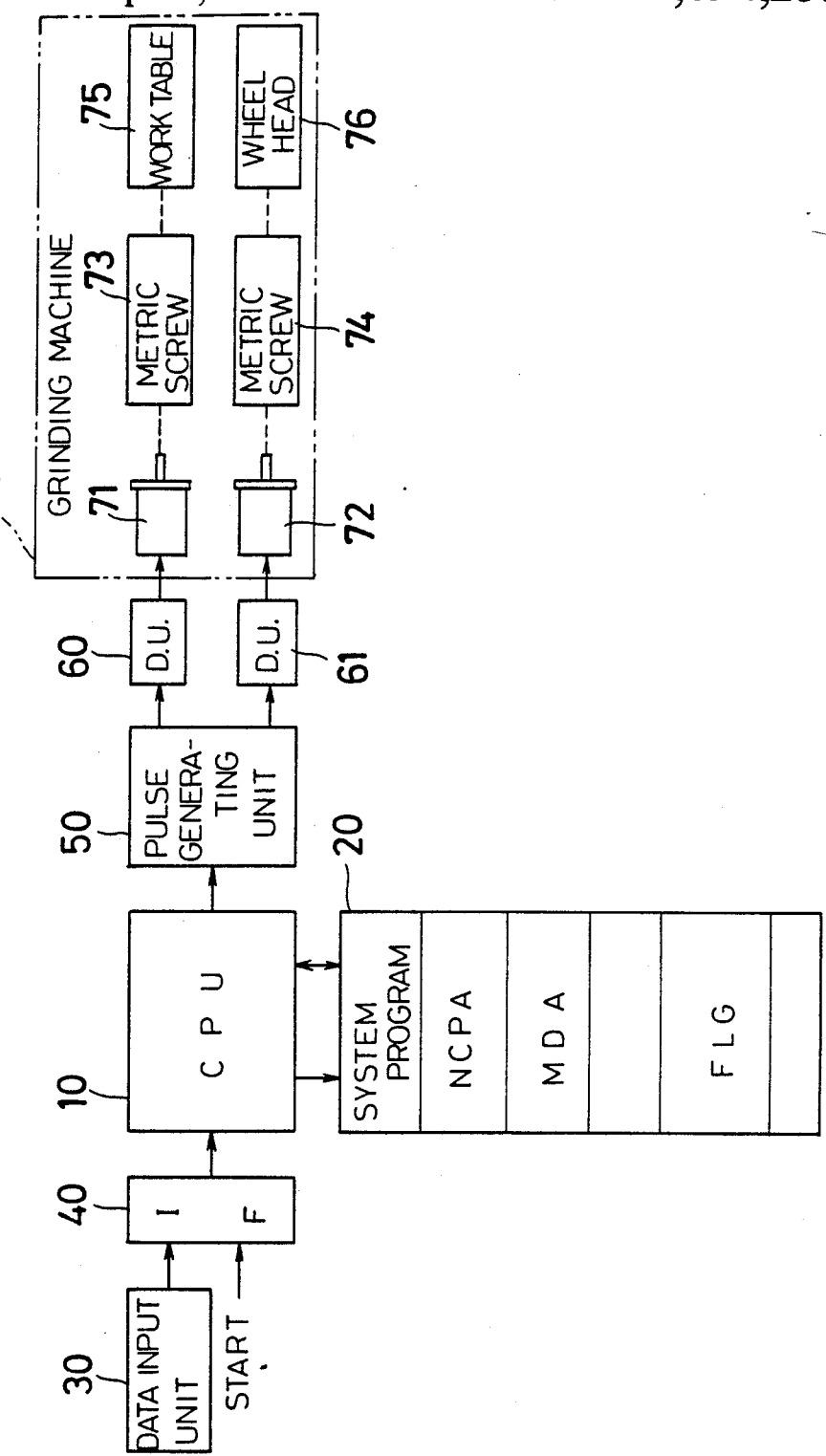
FIG. 1 is a block diagram of a numerical control apparatus for a machine according to the present invention.

Referring now to the drawings, wherein like reference numerals or characters refer to identical or corresponding parts throughout the several views, and more particularly to FIG. 1, a block diagram of a numerical control apparatus for grinding machine MT is illustrated. The numerical control apparatus comprises a central processing unit (hereafter referred to a "CPU") 10 and a memory 20. A data input 30 is connected to CPU 10 by way of an interface 40. A pulse generating unit 50 is controlled by the CPU, and servomotor drive units 60, 61 are, in turn, coupled to pulse generating unit 50 such that the servomotor drive units operate in response to pulses from the pulse generating unit. Servomotors 71, 72 of a grinding machine MT are connected to servomotor drive units 60, 61, and are drivingly connected with a worktable 75 and a wheel head 76 by way of respective metric feed screws 73, 74 and nuts (not shown).

Figure 2A:
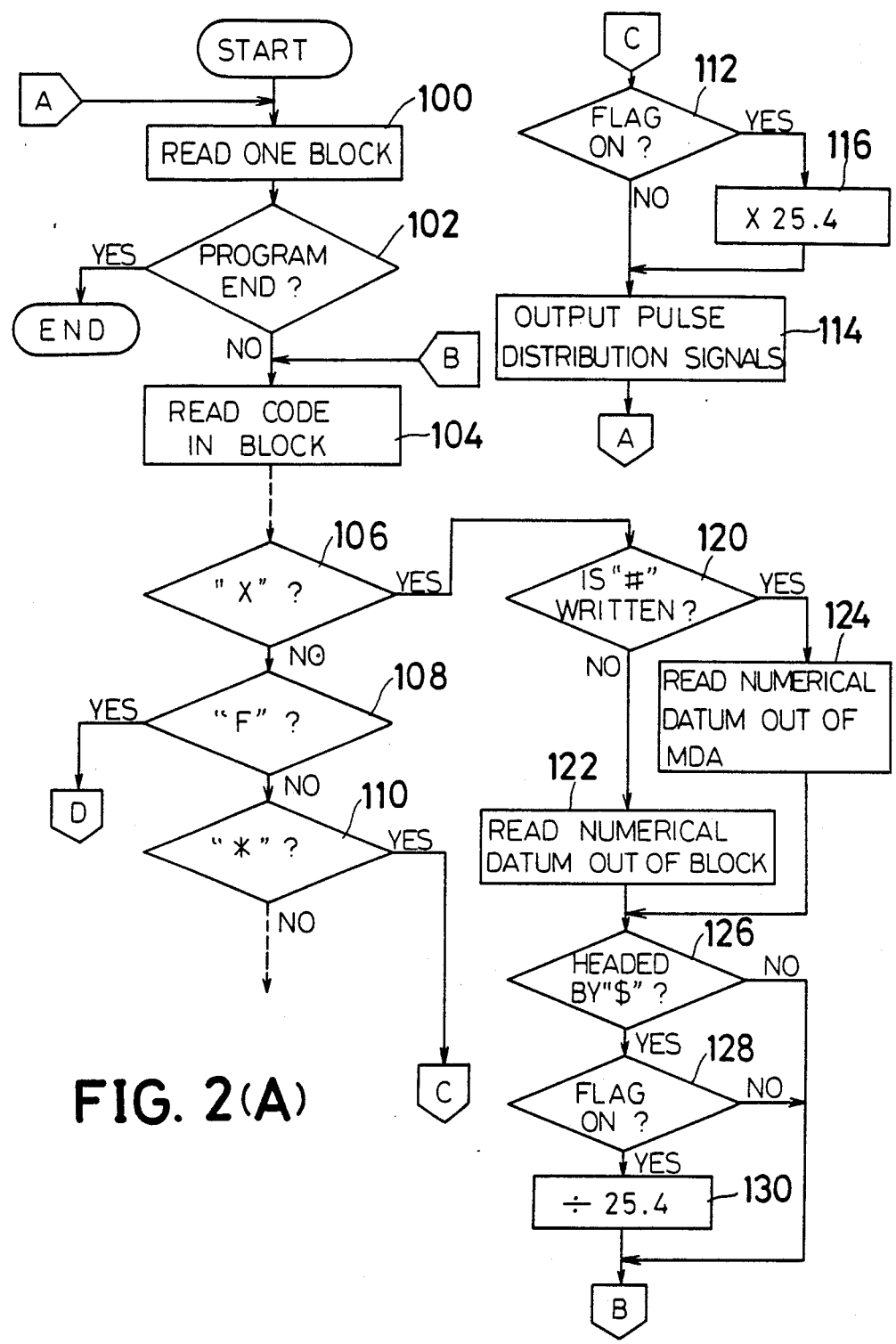

In memory 20 there is allocated address space for a system program such as shown in FIG. 2(A), 2(B) which is executed by CPU 10 so as to control operations of grinding machine MT by, for instance, controlling distribution of pulses to servomotor drive units 60, 61. In addition, memory 20 includes a numerical control program storage area NCPA wherein there are stored numerical control programs (hereinafter referred to as NC program) for performing operations of grinding machine MT such as movements of worktable 75 and wheel head 76. Memory 20 also has a numerical data storage area MDA wherein variable numerical data, possibly input by the manufacturer, are stored, which may be referred to by the numerical control programs to define parameters such as feed amount and feed rate of the movements of worktable 75 and wheel head 76. In memory 20 there is also allocated a flag storage area FLG wherein a flag is registered to show that the numerical control is being used in a country having the English system of measurement. The NC programs and variable numerical data are respectively input into numerical control program storage area NCPA and numerical data storage area MDA by means of data input unit 30. The flag is also registered or erased from flag storage area FLG by means of data input unit 30. Non-existence of the flag in the flag storage area FLG shows that the numerical control apparatus is set to be operable in the metric system of measurement.

Figure 3A:
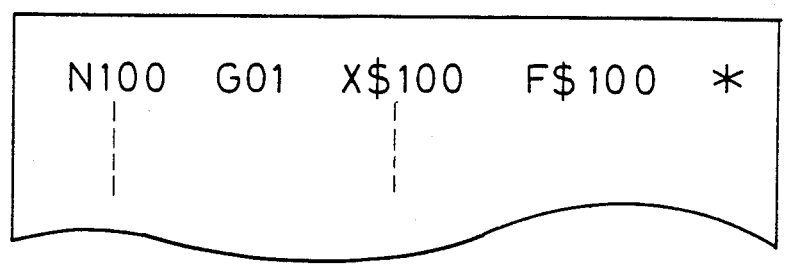
Figure 3B:
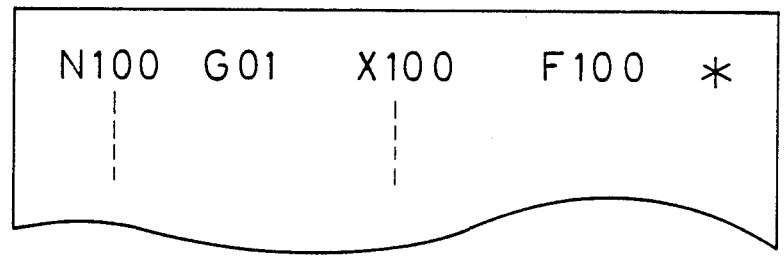
Figure 3C:
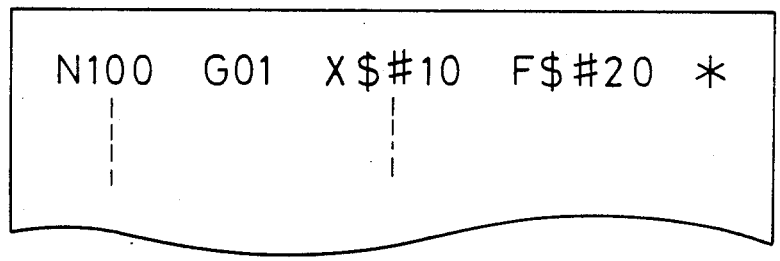

While the grinding machine is being built, adjusted and preliminarily operated by a manufacturer in a country using the metric sytem of measurement, the flag is erased from flag storage area FLG by means of data input unit 30. A NC program for performing basic movements of grinding machine MT includes numerical data representing parameters such as feed amount (X) and feed rate (F) of the movements of worktable 75 as shown in FIG. 3(A), or includes, as shown in FIG. 3(C), addresses of locations of numerical data storage area MDA wherein numerical data are stored. Numerical data stored in numerical data storage area MDA can be varied by means of data input unit 30.

As the numerical data for the basic movements of grinding machine MT are initially set by the manufacturer, such numerical data are more easily expressed in the metric system of measurement. Numerical data directly included in the NC programs for performing the basic movements of grinding machine are headed by respective codes "$" to show that they are expressed in the metric system of measurement. The addresses included in such NC programs are also headed by codes "$" to show that variable numerical data stored in the address locations of numerical data storage area MDA are expressed in the metric system.

When the grinding machine is used by a user in a country using the English system of measurement, data relied upon by the CPU may be expressed in metric system (input by the manufacturer) or in English system (input by user) or in a mixture of the two. The invention reconciles any such mixture by a conversion based upon the system used in the country of use. More particularly, a flag is registered in flag storage area FLG to show that the numerical control apparatus is set to respond to instructions in both the English and metric system. The user may then create and use an NC program for performing a specific grinding operation on a workpiece which includes numerical data expressed in the English system of measurement.

Execution of the system program shown in FIGS. 2(A), 2(B) by CPU 10 will now be explained. At step 100, one block of an NC program is read from the numerical control program area NCPA. For example, the block N100 of FIGS. 3(A), 3(B) or 3(C) is so read. It is ascertained whether or not the block shows the end of the program (step 102). If the block shows completion of the NC program, the execution of the system program is ended, but if not, each code in the block is read in order at step 104. It is then ascertained whether or not the code read at step 104 is code X (step 106). Code X denotes that following numeral datum shows a feed amount of worktable 75 along X axis. If code X is ascertained at step 106, it is next ascertained (step 120) whether or not there is written a code number denoting that the following datum is an address location in MDA. If code # is ascertained at step 120, as shown in FIG. 3(C), a numerical datum which denotes a feed amount of worktable 75 is read out of a location in numerical data storage area MDA which has an address indicated by a number following the code number (step 124). If code # is not written, a numerical datum (such as 100 in FIGS. 3(A) or 3(B)) which follows code X and denotes a feed amount of worktable 75 is read (step 122).

Now, assuming that the grinding machine MT is used by a user in a country using the English system of measurement, the Flag will be on. At step 126, it is ascertained whether or not the numerical datum or address code # is headed by code $ (FIG. 3(B)). Code $ indicates that the following numerical datum is expressed in the Metric system of measurement. If the numerical datum is not headed by code $, it is expressed in the English system, because the grinding machine MT is used in a country using the English system.

If the numerical datum is not headed by code $, a next code in the block is read (step 104). If the numerical datum is headed by code $ (FIG. 3(A)), it is ascertained at step 128 whether the flag is registered in flag storage area FLG to set the numerical control apparatus to be operable for data expressed in the English system. Therefore, since the flag is on (an English system country), the numerical datum headed by code $ is divided by 25.4 to be expressed in the English system at step 130, thereby consistently delivering English system data to step 112 for operation. Thereafter, the next code in the block is read at step 104.

When the next code is ascertained to be feed rate code F at step 108, a similar procedure as steps 120 through 130 is executed at step 132 through 142 as shown in FIG. 2(B). If code # is written as shown in FIG. 3(C), a numerical datum which denotes a feed rate is read out of a location in numerical data storage area MDA which has an address indicated by a number following code # (step 136). If code # is not written, a numerical datum which follows code F in the block and denotes a feed rate is read (step 134). If the numerical datum is ascertained not to be headed by code $ at step 138, a next code in the block is read (step 104). When the numerical datum is headed by code $, it is ascertained at step 104 that the flag is registered in flag storage area FLG, and then the numerical datum headed by code $ is divided by 25.4 at step 142. Thereafter, the next code in the block is read at step 104.

If the code read at step 104 is ascertained to be code * (at step 110), which shows the end of the block, step 112 is executed. As the flag is registered in flag storage area FLG, numerical data denoting the feed amount and feed rate are multiplied by 25.4 to be expressed in the metric system of measurement (step 116), since the pulse generating unit 50 is calibrated in the metric system. At step 114, signals for controlling pulse generating unit 50 are generated in accordance with the numerical data converted into the metric system and are delivered thereto. Accordingly, pulse generating unit 50 generates the desired number of pulses, with the desired frequency, which is fittable to the feed mechanism of the grinding machine using metric feed screw 73. Generated pulses are transmitted to servomotor 71 via servomotor drive unit 60 to move worktable 75 by the feed amount, with the feed rate as commanded by the numerical data.

Assuming that the grinding machine MT is built and preliminarily operated by the manufacturer in the country using the metric system of measurement, numerical data may be expressed in the metric system even if they are not headed by a code $ (FIG. 3(B)). Therefore, after the numerical datum regarding the feed amount X of worktable 75 is read out of the block of NC program (step 122), or out of the numerical data storage area MDA (step 124), a next code in the block is read at step 104 without going to step 130. Similarly, after the numerical datum regarding the feed rate F is read at step 134 or 136, a next code in the block is read at step 104 without going to step 142. Thereafter, when code * is ascertained at step 110, the numerical data denoting the feed amount and feed rate in the metric system are utilized to generate signals for controlling pulse generating unit 50 at step 114.

Figure 4:
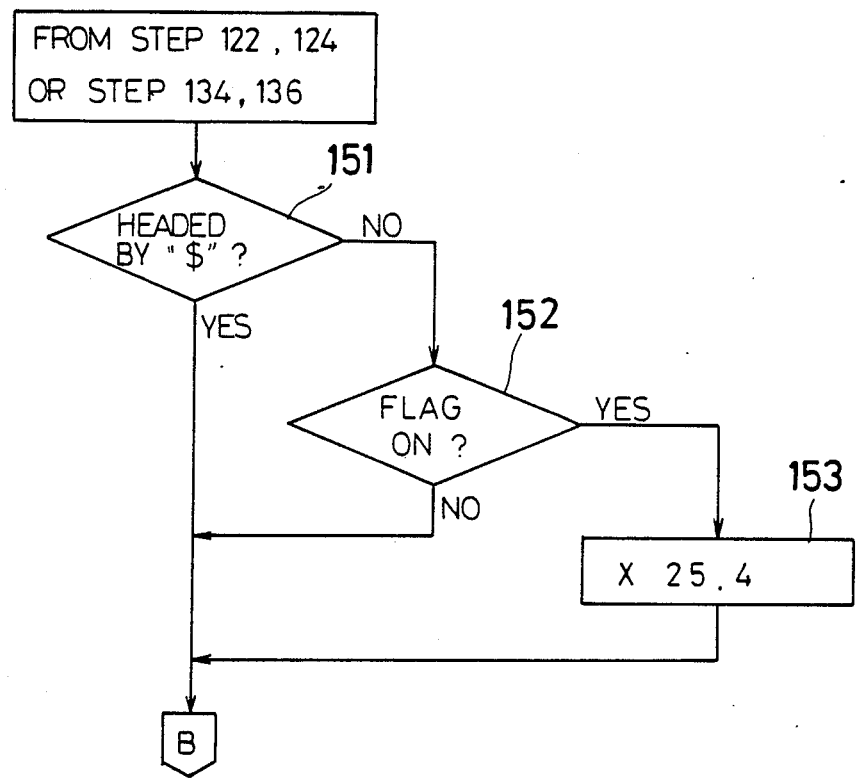
FIG. 4 is a flow chart of a second embodiment of system program executed by a central processing unit.
Figure 4:
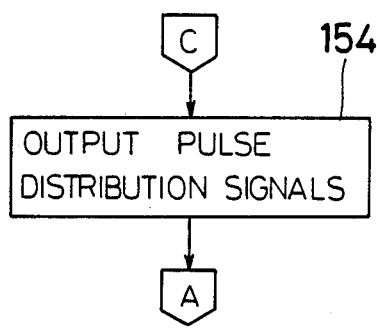

Another example of a system program is shown in FIG. 4, wherein numerical data directly read out of a block of the NC program (step 122 and 134) or out of data storage area MDA (step 124 and 136) are processed as follows. Assuming that the grinding machine MT is used by the user in the country using the English system of measurement, at step 151 it is ascertained whether or not the numerical datum or code # is headed by code $. If the numerical datum is headed by code $, a next code in the block is read (step 104). If the numerical datum is not headed by code $, it is ascertained at step 152 that the flag is registered in flag storage area FLG. The numerical datum is then multiplied by 25.4 at step 153 to be expressed in the metric system, and then the next code in the block is read (step 104). When the next code is ascertained to be code * at step 110, the numerical data expressed in the metric system are utilized to generate signals for controlling pulse generating unit 50 at step 154.

When the grinding machine MT is built and preliminarily operated by the maker in the country using the metric system of measurement, numerical data which are expressed in the metric system need not be headed by code $. Therefore, the numerical data are read without multiplication until code * is read. If code * is ascertained, step 154 is executed.

Although movement of worktable 75 along the X axis is explained in the above-described embodiments of a system program, movements of other movable elements such as movement of wheel head 76 along the Y axis can be controlled similarly.

Further, a numerical control apparatus according to the present invention can also control a laser machine, a robot, a drafting machine and so forth.

Moreover, should it be required, a machine controlled by a numerical control apparatus might be built in a country using the English system of measurement and be sold in a country using the metric system of measurement. However, in this case, the flag registered in flag storage area FLG shows that the numerical control apparatus is set to be operable in the metric system, and the numerical data headed by code $ are expressed in the English system. In addition, the numerical data are to be multiplied by 25.4 at step 130 and step 142, and to be divided by 25.4 at step 116 and step 153.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A numerical control apparatus for controlling a machine which has a movable element and a servomotor for moving said movable element, said numerical control apparatus comprising:

memory means for storing numerical data representing numerical characteristics of movement of said movable element, said numerical data being expressable in either one of a first system of measurement and a second system of measurement;

code means stored in said memory means for said numerical data expressed in said first system of measurement;

means for ascertaining when said code means is stored;

means for setting said numerical control apparatus to be operable for data expressed in one of said first system of measurement and in said second system of measurement;

means for ascertaining for which system of measurement said numerical control apparatus is set to be operable;

means responsive to said code ascertaining means and said system ascertaining means for converting said numerical data expressed in said second system of measurement into numerical data expressed in said first system of measurement when said numerical control apparatus is set to be operable for data expressed in said second system of measurement; and means for exciting said servomotor in accordance with said numerical data stored in said memory means when said code ascertaining means ascertains the presence of said code means, and in accordance with said numerical data converted by said converting means when said code ascertaining means ascertains the absence of said code means and said numerical control apparatus is set to be operable for data expressed in said second system of measurement.

2. A numerical control apparatus as set forth in claim 1, wherein said first system of measurement is the metric system of measurement and said second system of measurement is the English system of measurement.

3. A numerical control apparatus as set forth in claim 1, wherein said first system of measurement is the English system of measurement and said second system of measurement is the metric system of measurement.

4. A numerical control apparatus for controlling a machine which has a movable element and a servomotor for moving said movable element, said numerical control apparatus comprising:

memory means for storing numerical data representing numerical characteristics of movements of said movable element, said numerical data being expressable in either one of a first system of measurement and in a second system of measurement;

code means stored in said memory means for some of said numerical data which are expressed in said first system of measurement to define basic movements of said element;

means for ascertaining when said code means is stored;

means for setting said numerical control apparatus to be operable for data expressed in one of said first system of measurement and in said second system of measurement;

means for ascertaining for which system of measurement said numerical control apparatus is set to be operable;

means responsive to said code ascertaining means and said system ascertaining means for converting said numerical data expressed in said second system of measurement into data expressed in said first system of measurement when said numerical control apparatus is set to be operable for data expressed in said second system of measurement; and means for exciting said servomotor in accordance with said numerical data stored in said memory means when said code ascertaining means ascertains the presence of said code means and in accordance with said numerical data converted by said converting means when said code ascertaining means ascertains the absence of said code means and said numerical control apparatus is set to be operable for data expressed in said second system of measurement.

5. A numerical control apparatus as set forth in claim 4, wherein said first system of measurement is the metric system of measurement and said second system of measurement is the English system of measurement.

6. A numerical control apparatus as set forth in claim 4, wherein said first system of measurement is the English system of measurement, and said second system of measurement is the metric system of measurement.

7. A numerical control apparatus for controlling a machine which has a movable element and a servomotor for moving said movable element, said numerical control apparatus comprising:

memory means for storing numerical data representing numerical characteristics of movement of said movable element, said numerical data being expressable in either one of a first system of measurement and a second system of measurement;

code means stored in said memory means for said numerical data expressed in said first system of measurement;

means for ascertaining when said code means is stored;

means for setting said numerical control apparatus to be operable for data expressed in one of said first system of measurement and in said second system of measurement;

means for ascertaining for which system of measurement said numerical control apparatus is set to be operable;

means responsive to said code ascertaining means and said system ascertaining means for converting said numerical data such that all of said numerical data is consistently expressed in one of said first and second systems;

means for exciting said servamotor in accordance with said consistently expressed numerical data.

8. A numerical control apparatus as set forth in claim 7 wherein said means for exciting includes means for exciting said servamotor in accordance with said consistently expressed numerical data expressed in the other of said systems, further including means for converting said consistently expressed numerical data expressed in said one of said systems into said other of said systems.

9. A numerical control apparatus as set forth in claim 7 wherein said means for exciting includes means for exciting said servamotor in accordance with said consistently expressed numerical data expressed in said one of said systems.

* * * * *